United States Patent [19]

Van De Voorde et al.

[11] Patent Number: 5,754,319

[45] Date of Patent: May 19, 1998

[54] OPTICAL AMPLIFIER COMBINER ARRANGEMENT AND METHOD FOR UPSTREAM TRANSMISSION REALIZED THEREBY

[75] Inventors: Ingrid Zulma Benoit Van De Voorde, Wilrijk; Gert Van Der Plas, Merchtem, both of Belgium

[73] Assignee: Alcatel N.V., Rijswijk, Netherlands

[21] Appl. No.: 714,342

[22] Filed: Sep. 16, 1996

[30] Foreign Application Priority Data

Sep. 21, 1995 [EP] European Pat. Off. ............ 95202553

[51] Int. Cl.[6] .................................................. H04B 10/02
[52] U.S. Cl. ............................ 359/109; 359/176; 359/179
[58] Field of Search ............................. 359/117, 120, 359/121, 126, 174, 176, 177, 178, 179, 341, 344, 109

[56] References Cited

U.S. PATENT DOCUMENTS

| | | | |
|---|---|---|---|
| 4,726,010 | 2/1988 | Ali et al. | 359/125 |
| 5,150,247 | 9/1992 | Sharpe et al. | 359/135 |
| 5,153,762 | 10/1992 | Huber | 359/125 |
| 5,241,414 | 8/1993 | Giles et al. | 359/345 |
| 5,278,686 | 1/1994 | Grasso et al. | 359/110 |
| 5,337,175 | 8/1994 | Ohnsorge et al. | 359/125 |
| 5,353,285 | 10/1994 | Van Der Plas et al. | 370/84 |
| 5,379,143 | 1/1995 | Takano | 359/177 |
| 5,392,154 | 2/1995 | Chang et al. | 359/341 |
| 5,440,418 | 8/1995 | Ishimura et al. | 359/177 |
| 5,457,560 | 10/1995 | Sharpe et al. | 359/137 |
| 5,610,744 | 3/1997 | Ho et al. | 359/125 |

FOREIGN PATENT DOCUMENTS

| | | |
|---|---|---|
| 0425871 | 5/1991 | European Pat. Off. . |
| 0499065 | 8/1992 | European Pat. Off. . |
| 0506163 | 9/1992 | European Pat. Off. . |
| 0534433 | 3/1993 | European Pat. Off. . |
| 0544975 | 6/1993 | European Pat. Off. . |

OTHER PUBLICATIONS

"Network Design for the Information Superhighway", P. France et al, *Proc. Thirteenth Annual Conference on European Fibre Optic Communications and Networks*, Brighton, England Jun. 27–30, 1995, vol. 1, pp. 23–26.

*Primary Examiner*—Rafael Bacares
*Attorney, Agent, or Firm*—Ware, Fressola, Van Der Sluys & Adolphson

[57] ABSTRACT

The optical amplifier combiner arrangement is used in a tree-like optical network (APON) comprising a cascade connection of dedicated branches, of the arrangement and of a common branch. The arrangement is coupled between a plurality of optical network users and an optical line terminator, via the dedicated branches and the common branch respectively. The network enables upstream transmission of information signals from the optical network users to the optical line terminator. The optical amplifier combiner arrangement includes for each branch of the dedicated branches (1) an optical amplifier to amplify an information signal with a gain value and to thereby generate an amplified information signal with a predetermined power level, (2) an optical on/off switch coupled between the optical amplifier and an optical combiner to pass the amplified information signal when the information signal is present and to interrupt the branch when the information signal is not present. The optical combiner is included in the arrangement to combine all amplified information signals according to a multiple access technique and to thereby generate an outgoing optical signal for application to the optical line terminator.

10 Claims, 4 Drawing Sheets

OPTICAL AMPLIFIER COMBINER ARRANGEMENT AND METHOD FOR UPSTREAM TRANSMISSION REALIZED THEREBY

TECHNICAL FIELD

The present invention relates to an optical amplifier combiner arrangement and a method for upstream transmission realized thereby, used in a tree-like optical network to perform upstream transmission.

BACKGROUND OF THE INVENTION

Such an optical amplifier combiner and such a method are already known in the art, e.g. from the article 'Network Design for the Information Superhighway' written by P. W. France, J. H. Mackenzie and others, published by The European Institute for Communications and Networks in the book Proceedings volume 1 Papers on Broadband Superhighway wherein passive optical networks are described which use such a combiner and which realize such a method. These passive optical network systems are developed to meet the emerging superhighway requirements such as the capability to provide both existing narrowband and new broadband distributive and interactive services to serve both business and residential customers.

However serving business and residential customers requires a much higher splitting factor than provided by these known networks. A main problem in the realization of high splitting factors occurs during the upstream transmission. Indeed, due to this high splitting factor a high power-budget must be overcome. The demanding optical power-budget for transmission is supported by the implementation of optical amplifiers in the dedicated branches. However, due to the multiple access technique used at the optical combiner which combines the information signals, all these optical amplifiers contribute to an accumulation of ASE (amplified spontaneous emission) noise, even when the optical amplifier does not carry an information signal and as a result thereof, the ASE noise can reach such an amplitude that the transmitted signals are degraded.

DISCLOSURE OF INVENTION

An object of the present invention is to provide an optical amplifier combiner arrangement and a method such as the above known ones but which are suited for networks with high splitting factors, i.e. which ensure that the transmitted signals can not be degraded by the relatively high ASE noise.

According to a first aspect of the invention, an optical amplifier combiner arrangement for use in a tree-like optical network comprising a cascade connection of dedicated input branches and of a common output branch, said arrangement for interconnection between a plurality of optical network users and an optical line terminator, said optical network enabling upstream transmission of information signals from said optical network users to said optical network users to said optical line terminator, is characterized in that each branch of said dedicated branches comprises an optical amplifier responsive to a respective one of said information signals transmitted over said branch, with a gain value, for providing an amplified information signal with a predetermined power level, and an optical on/off switch, responsive to said amplified information signal for passing said amplified information signal for providing a passed amplified information signal when it is present and for otherwise interrupting said branch for preventing passing any information signal, and in that said optical amplifier arrangement further comprises an optical combiner responsive to said amplified information signal from each of said branches for providing an outgoing optical signal on said common optical branch according to a selected multiple access technique to said optical line terminator.

According to a second aspect of the invention, a method used in a tree-like optical network to perform upstream transmission of information signals from a plurality of optical network users to an optical line terminator via dedicated branches and a common branch respectively, is characterized in that said method for each one of said information signals comprises the steps of:

a. amplifying said information signal and thereby generating an amplified information signal;
b. passing said amplified information signal when said information signal is present and otherwise interrupting said branch; said method further comprising the step of:
c. combining all amplified information signals from all said dedicated branches according to a multiple access technique for generating an outgoing optical signal for transmission to said optical line terminator.

Indeed, since the branches which carry no information signal, are interrupted with the optical switches on/off, these branches can not contribute to the accumulation of ASE noise at the optical combiner.

A possible implementation of the control of the optical amplifier combiner arrangement is that for each branch the gain value of the optical amplifier and the optical switch on/off are controlled respectively by means of a first and second electrical control sign. Thus, according to a second aspect of the present invention, an optical amplifier combiner arrangement according to the first aspects of the invention is characterized in that said arrangement further comprises for each said branch a control means, responsive to said respective one of said information signals, for providing a first electrical control signal to said optical amplifier for controlling a gain value thereof and for providing a second electrical control signal for controlling said on/off switch. The first electrical control signal is composed of gain setting data and gain tuning data. This gain tuning data is introduced to compensate deviations of the optical amplification due to e.g. sensitiveness with respect to temperature and time of the optical amplifier.

An additional characteristic feature of the first aspect of the invention is that, the switch on/off is controlled by means of the second electrical control signal which results from the detection of the presence of an information signal on the corresponding branch.

According further to the first aspect of the present invention, the optical combiner is provided to combine said amplified information signals according to a time division multiple access technique, and said arrangement also includes an optical network terminator for performing operation and maintenance functions and which is coupled to said optical line terminator and said control means, said optical network terminator being included to capture special grant information out of downstream signals sent from said optical line terminator to said optical network users and to apply said special grant information to said control means to thereby enable said control means to determine whether said information signal is present within a predetermined time interval and to determine said second electrical control signal as a result thereof.

Thus, another way of controlling the switch on/off is thus based on the use, in an optical network using for upstream transmission a time division multiple access technique, of the detection of special grant information out of downstream information. The use of such special grant information to realize time division multiple access is well known in the art, e.g. from the publisched European patent application with publication number EP-0 544 975 wherein a time slot management system is described which allows upstream transmission. The stream of station identities used therein is similar to the special grant information. In such an implementation, the second electrical control signal is determined by the detection of special grant information in downstream information.

Yet a further characteristic feature of the present invention is that, the gain setting data is determined by measuring the power of the information signal.

Another characteristic feature of the present invention is that, the gain tuning data is determined by measuring the power of the amplified information signal.

An alternative way to determine the gain tuning data is to use a memory means to memorize the value of the last measured power of an amplified signal and to use this value to control the gain tuning data for a following transmitted information signal.

Another way to determine the gain tuning data is to introduce a power level unit to measure the power level of the outgoing optical signal to determine the gain tuning data for the branches carrying an information signal. In this way, instead of measuring the power for each dedicated branch, only one power measurement has to be performed which is less power consuming.

Still another characteristic feature is the integration of the optical combiner with all optical switches on/off in one optical switch.

The above mentioned and other objects and features of the invention will become more apparent and the invention itself will be best understood by referring to the following description of an embodiment taken in conjunction with the accompanying drawing.

BEST MODE FOR CARRYING OUT THE INVENTION

Figure 1:
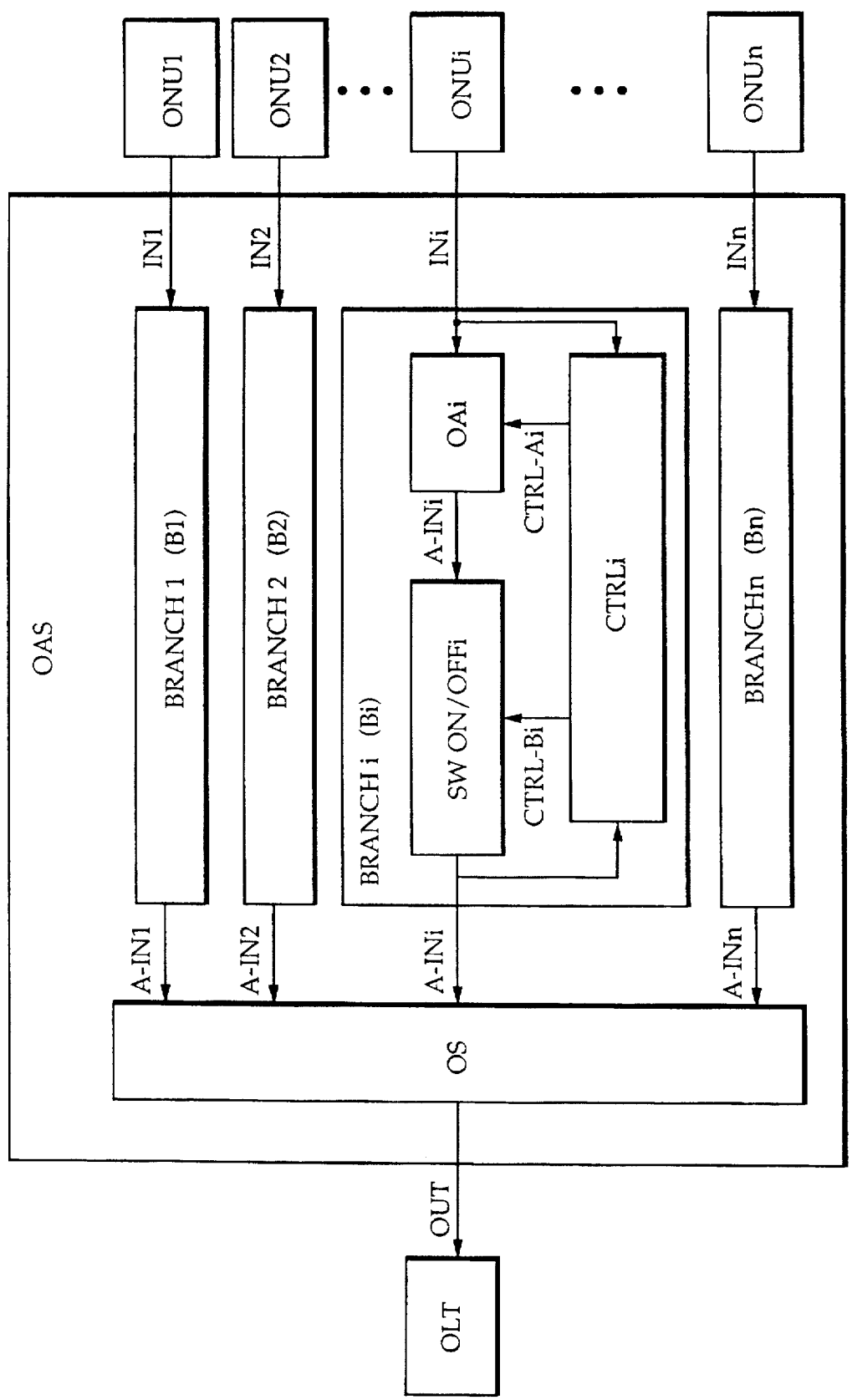
FIG. 1 illustrates an optical amplifier combiner arrangement for use in a tree-like optical network to perform upstream transmission of information signals from a plurality of optical network users to an optical line terminator via dedicated branches and a common branch, respectively, according to the present invention.

First, the optical amplifier combiner arrangement OAS will be explained by means of a functional description of the blocks shown in FIG. 1. Based on this description, implementation of the functional blocks in the figure, it will be evident to a person skilled in the art how to make and use the invention.

The optical amplifier combiner arrangement OAS is used in a tree-like optical network consisting of the cascade connection of dedicated branches B1, B2, ... Bi, ... Bn and of the optical amplifier combiner arrangement OAS and of a common branch (OUT). The optical amplifier combiner arrangement OAS is coupled between a plurality of optical network users ONU1, ONU2, ..., ONUi, ..., ONUn and an optical line terminator OLT via the above mentioned dedicated branches and common branch respectively.

The optical amplifier combiner arrangement OAS includes for each branch e.g. Bi, of the dedicated branches B1, B2, ..., Bi, ..., Bn two basic parts:

an optical amplifier OAi coupled to the respective netwotk user ONUi of the optical network users ONU1, ONU2, ..., ONUi, ..., ONUn; and an optical on/off switch SW ON/OFFi coupled between the optical amplifier OAi and an optical combiner OS.

The optical combiner OS is coupled between all optical on/off switches SW ON/OFF1, SW ON/OFF2, ..., SW ON/OFFi, ..., SW ON/OFFn which are similar to the optical on/off switch SW ON/OFFi and the optical line terminator OLT.

The optical amplifier combiner arrangement OAS enables upstream transmission in the optical network of information signals IN1, IN2, ..., INi, ..., INn from the optical network users ONU1, ONU2, ..., ONUi, ..., ONUn to the optical line terminator OLT.

The principle working of the optical amplifier combiner OAS will be explained in the following paragraph with respect to a signal INi transmitted over a branch Bi, the working with respect to the other branches being identical.

The optical amplifier OAi amplifies INi with a gain value Gi (not shown) and generates thereby an amplified information signal A-INi with a predetermined power level.

The optical on/off switch SW ON/OFFi passes the amplified information signal A-INi when it is present, but interrupts the branch Bi when the amplified information signal A-INi is not present. It does not therefore pass any signal when it interrupts the branch Bi.

The optical combiner OS combines all amplified information signals A-IN1, A-IN2, ..., A-INi, ... A-INn similar to the amplified information signal, A-INi according to a multiple access technique and generates thereby an outgoing optical signal OUT for application to the optical line terminator OLT.

In this embodiment the working of the optical amplifier OAi and the optical on/off switch SW ON/OFFi of each branch Bi is controlled by means of control means CTRLi. The control means CTRLi is coupled to the OAi and the optical on/off switch SW ON/OFFi and controls:

the gain value Gi by means of a first electrical control signal CTRL-Ai composed of gain setting data GSi (not shown) and gain tuning data GTi (not shown); and the on/off switch SW ON/OFFi by means of a second electrical control signal CTGRL-Bi.

The gain setting data GSi, the gain tuning data GTi and the second electrical control signal CTRL-Bi can be determined in different ways. A few particular implementations to determine them are described in a functional way in the following paragraphs, but they are shown in different figures to avoid overloading FIG. 1.

Figure 2:
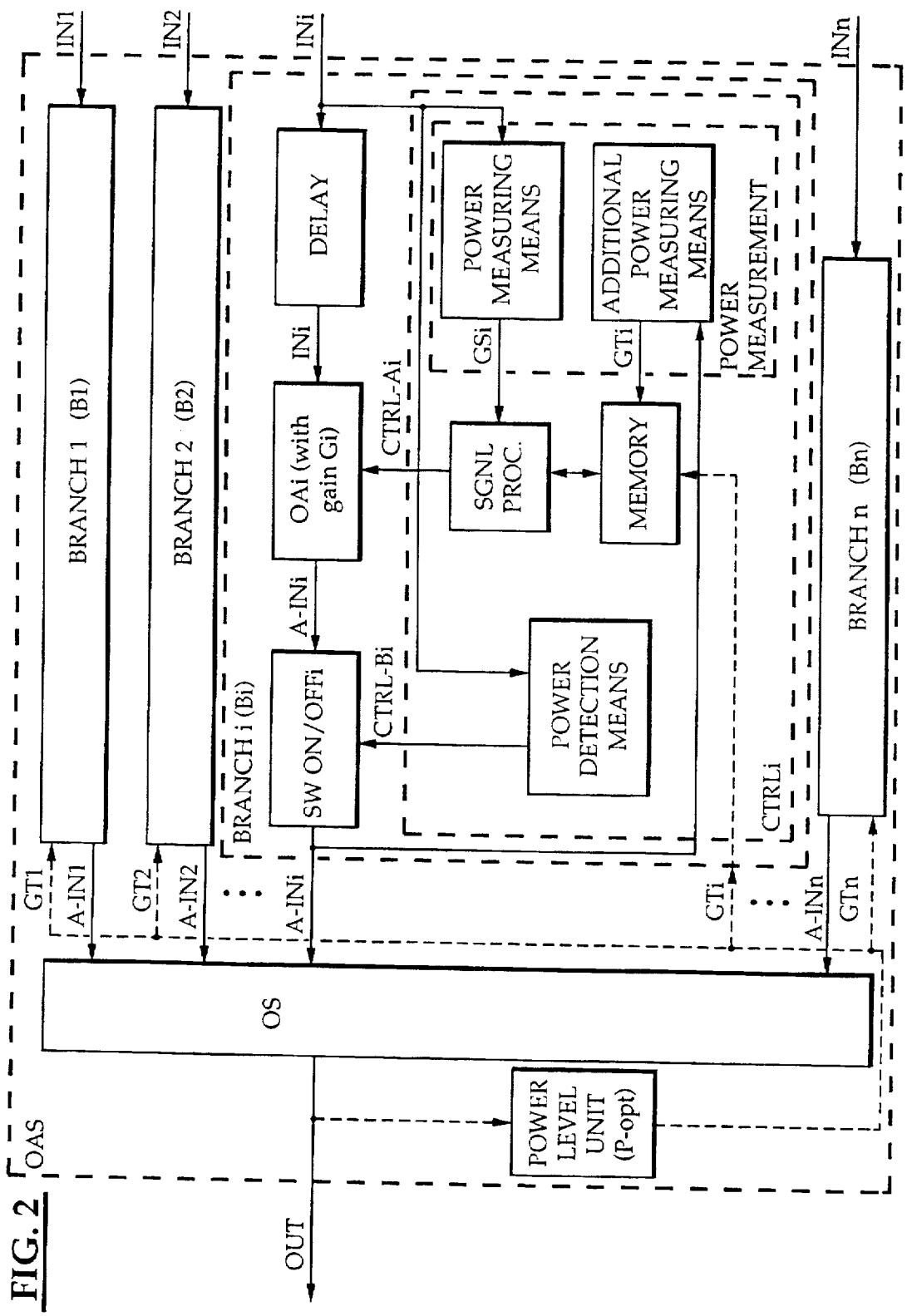
FIG. 2 illustrates further details of the optical amplifier combiner arrangement of the present invention, including an illustration of one way to detect power on the input side of each branch and illustrating various alternative power measurement techniques for controlling the gain of the amplifier of each branch.

To determine the second electrical control signal CTRL-Bi, for each branch Bi, the control means CTRLi further includes power detection means, as shown in FIG. 2, which via an optical tap draws off the information signal INi a small power part. The power detection means determines whether the information signal INi is present or is not present and determines the second electrical control signal CTRL-Bi as a result thereof.

To determine the gain setting data GSi, for each branch Bi, the control means CTRLi further includes power measuring means. The same optical tap as above is used and the power measuring means measures the power of the information signal INi and determines the gain setting data GSi based thereon.

It has to be noted here, that to ensure that the power measuring means has enough time to fulfil its function, an optical delay line (not shown) is coupled between the optical tap and the optical amplifier OAi. The optical delay line delays the information signal INi until the optical amplifier OAi is adjusted.

To determine the gain tuning data GTi, for each branch Bi, the control means CTRLi further includes additional power measuring means. Via an additional optical tap, coupled between the optical on/off switch SW ON/OFFi and the optical combiner OS a small power part is drawn off the amplified information signal A-INi and the additional power measuring means measures the power of the amplified information signal A-INi and determines the gain tuning data GTi based thereon. In a signal processor, the gain setting data (GS); and the gain tuning data (GT) can together be processed to determine the first electrical control signal CTRL-Ai.

Furthermore it is noted that although for the optical amplifier OAi an erbium doped fiber amplifier is used, semiconductor optical amplifiers are very good candidates to use in this implementation because of their low switch-on time. It is also remarked that these semiconductor optical amplifiers can be used to integrate the functions of the optical amplifier OAi and of the optical on/off switch SW ON/OFFi.

Figure 3:
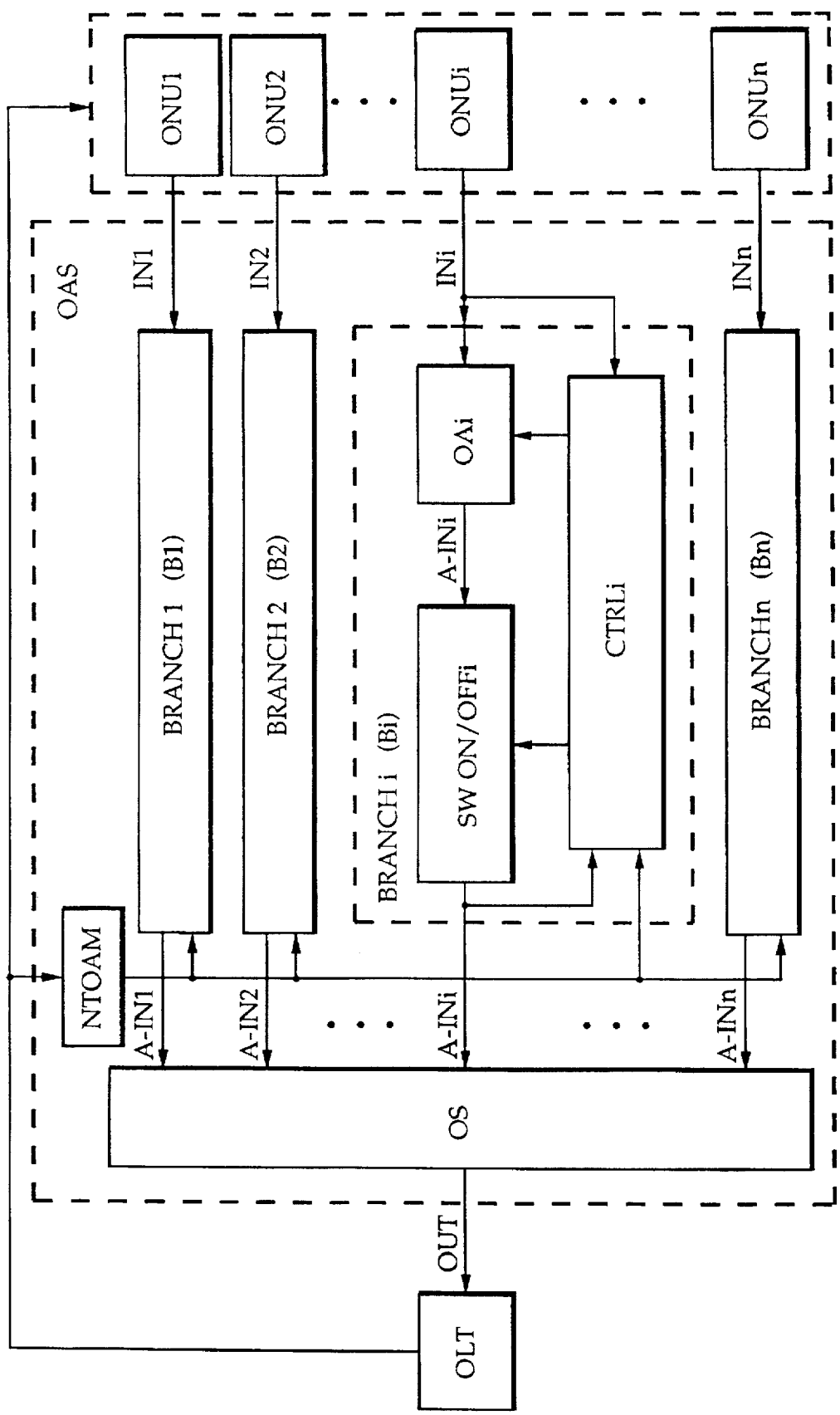
FIG. 3 shows exemplary means for carrying out a time division multiple access approach for controlling the on/off switch of each branch, according to the present invention.

As shown in FIG. 3, an alternative implementation to determine the second electrical control signal CTRL-Bi is realized for optical networks where the optical combiner OS combines the amplified information signals A-IN1, A-IN2, . . . , A-INi, . . . , A-INn according to a time division multiple access technique. For such an optical network, the optical amplifier combiner arrangement OAS includes an optical network terminator NTOAM (not shown) for performing operation and maintenance functions. The NTOAM is coupled to the optical line terminator OLT, by means of also an additional optical tap, and to the control means CTRLi. The additional optical tap draws off the downstream signals which are sent from the optical line terminator OLT to the optical network terminators ONU1, ONU2, . . . , ONUi, . . . . ONUn a small powerpart and provides this power fraction to the optical network terminator NTOAM which captures special grant information out of these downstream signals. According to the remark in the introduction, the use of special grant information to realize time division multiple access is well known in the art. With this special grant information, the optical network terminator NTOAM knows exactly when an information signal INi will be sent by an optical network user ONUi and when the information signal INi will be applied to the optical amplifier OAi. The special grant information is applied to the control means CTRLi which is now able to determine whether the information signal INi will be present or will not be present within a predetermined time interval and determines the second electrical control signal CTRL-Bi as a result thereof.

Still another alternative implementation to determine the gain tuning data GTi, for each branch Bi, is realised by including in the control means CTRLi, additional to measuring means to measure the power of an amplified information signal A-INi, also memory means to memorize the value of the measured power of the amplified signal. This value is used to determine the gain tuning data GTi for a following transmitted information signal INi.

Finally, it has to be remarked that an alternative way to determine the gain tuning data GTi, for each branch Bi, is realized with the implementation of one power level unit. The power level unit, included in the optical amplifier combiner arrangement OAS, is coupled between a control output of the optical combiner OS and the control means CTRLi associated with each branch Bi. The power level unit measures the power level of the outgoing optical signal OUT and provides the result thereof by means of electrical power level data to the control means CTRLi. The control means CTRLi is now able to determine the gain tuning data GTi if an information signal is present.

Figure 4:
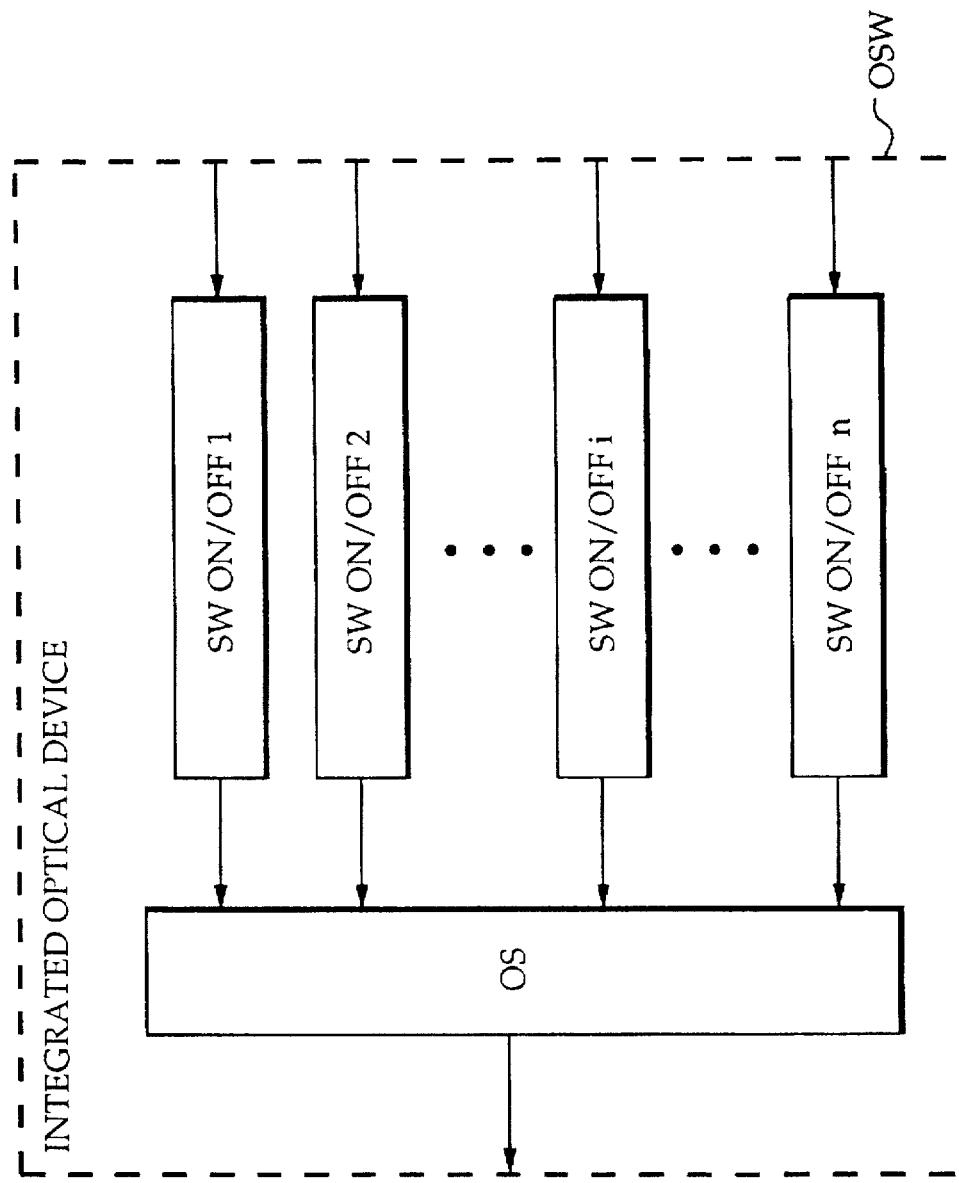
FIG. 4 shows an integrated optical device in which the optical combiner and all optical on/off switches are integrated in an optical device (OSW).

It has to be remarked that the optical combiner OS and all optical on/off switches SW ON/OFF1, SW ON/OFF2, . . . , SW ON/OFFi, . . . , SW ON/OFFn similar to the optical on/off switch SW ON/OFFi can be integrated in one optical switch, as shown in FIG. 4.

Since it will be evident to a person skilled in the art how to realize the above alternative implementations, based on their functional description, these realizations are not described in further detail.

It has also to be remarked that the outgoing optical signal OUT of the present optical amplifier combiner arrangement OAS has to be amplified in order to overcome a long distance to the optical line terminator OLT. With an efficient working of the different optical amplifiers OA1, OA2, . . . , OAi, . . . , OAn similar to the optical amplifier OAi in the optical amplifier combiner arrangement OAS and an appropriate access protocol that assures continuous upstream transmission for the outgoing signal OUT, the outgoing optical signal OUT has no longer a bursty character like the information signals IN1, IN2, . . . , INi, . . . , INn have. In this way, a fast gain setting optical amplifier is no longer required for the amplification of the optical outgoing signal OUT and standard optical amplifers can be used.

While the principles of the invention have been described above in connection with specific apparatus, it is to be clearly understood that this description is made only by way of example and not as a limitation on the scope of the invention.

We claim:

1. Optical amplifier combiner arrangement (OAS) for use in a tree-like optical network comprising a cascade connection of dedicated input branches (B1, B2, . . . , Bi, . . . , Bn) and of a common output branch, said arrangement for interconnection between a plurality of optical network users (ONU1, ONU2, . . . , ONUi, . . . , ONUn) and an optical line terminator (OLT), said optical network enabling upstream transmission of information signals (IN1, IN2, . . . , INi, . . . , INn) from said optical network users (ONU1, ONU2, . . . , ONUi, . . . ONUn) to said optical line terminator (OLT), characterized in that each branch (Bi) of said dedicated branches (B1, B2, . . . , Bi, . . . Bn) comprises:

an optical amplifier (OAi) responsive to a respective one (INi) of said information signals (IN1, IN2, . . . INi, . . . INn) transmitted over said branch (Bi), with a gain value (Gi), for providing an amplified information signal (A-INi) with a predetermined power level, an optical on/off switch (SW ON/OFFi), responsive to said amplified information signal for passing said amplified information signal (A-INi) for providing a passed amplified information signal when it is present and for otherwise interrupting said branch (Bi) for preventing passing of a signal by said branch (Bi), and in that said optical amplifier arrangement further comprises an optical combiner responsive to said amplified information signal from each of said branches for providing an outgoing optical signal (OUT) on said common optical branch according to a selected multiple access technique to said optical line terminator, and in that said arrangement (OAS) further comprises for each said branch (Bi) a control means (CTRLi), responsive to said respective one of said information signals, for providing a first electrical control signal (CTRL-Ai) to said optical amplifier (OAi) for controlling a gain value (Gi) thereof and for providing a second electrical control signal (CTRL-Bi) for controlling said on/off switch (SW ON/OFFi).

2. Optical amplifier combiner arrangement (OAS) according to claim 1 characterized in that for each said branch (Bi), said control means (CTRLi) further includes power detection means for detecting whether said one information signal (INi) is present for providing said second electrical control signal (CTRL-Bi).

3. Optical amplifier combiner arrangement (OAS) according to claim 1 characterized in that said arrangement (OAS) also includes an optical network terminator (NTOAM) for performing operation and maintenance functions and which is coupled to said optical line terminator (OLT) and said control means (CTRLi), said optical network terminator (NTOAM) being included to capture special grant information out of downstream signals sent from said optical line terminator (OLT) to said optical network users (ONU1, ONU2, . . . . . ONUi, . . . . . ONUn) and to apply said special grant information to said control means (CTRLi) to thereby enable said control means (CTRLi) to determine whether said information signal (INi) is present within a predetermined time interval and to determine said second electrical control signal (CTRL-Bi) as a result thereof.

4. Optical amplifier combiner arrangement according to claim 1, characterized in that said first electrical signal is comprised of gain setting data (GSi) and gain tuning data (GTi).

5. Optical amplifier combiner arrangement (OAS) according to claim 4 characterized in that for each said branch (Bi) said control means (CTRLi) further includes power measuring means provided for measuring power of said one information signal (INi) and for determining said gain setting data (GSi) based thereon.

6. Optical amplifier combiner arrangement (OAS) according to claim 4 characterized in that, for each said branch (Bi), said control means (CTRLi) further includes power measuring means provided for measuring power of said amplified information signal (A-INi) and for determining said gain tuning data (GTi) based thereon.

7. Optical amplifier combiner arrangement (OAS) according to claim 4 characterized in that, for each said branch (Bi), said control means (CTRLi) further includes power measuring means provided for measuring power of said amplified information signal (A-INi) for providing a value of measured power of said amplified information signal (A-INi) and further includes memory means for memorizing said value, said value for use in determining said gain tuning data (GTi).

8. Optical amplifier combiner arrangement (OAS) according to claim 4 characterized in that said arrangement (OAS) also includes a power level unit (P-opt) coupled between a control output of said optical combiner (OS) and said control means (CTRLi) associated with each branch (Bi), said power level unit being (P-opt) for measuring a power level of said outgoing optical signal (OUT) and for providing electrical power level data (P-OUT) to said control means (CTRLi) to thereby enable said control means (CTRLi) to determine said gain tuning data (GTi) when said information signal (A-INi) is present.

9. A method used in a tree-like optical network to perform upstream transmission of information signals (IN1 IN2, . . . , INi, . . . , In) from a plurality of optical network users (ONU1, ONU2, . . . . , ONUi, . . . , ONUn) to an optical line terminator (OLT) via dedicated branches (B1, B2, . . . . . Bi, . . . , Bn) and a common branch, respectively, characterized in that said method for each one (INi) of said information signals (IN1, IN2, . . . . , INi, . . . . , INn) comprises the steps of:

a. sensing said information signal (INi) for providing a control signal (CTRL-Ai) for controlling amplification of said information signal and for providing a switch control signal (CTRL-Bi);

b. amplifying said information signal (INi), in response to said amplification control signal, for providing an amplified information signal (A-INi);

c. passing, in response to said switch control signal, said amplified information signal (A-INi) when said information signal (INi) is present and otherwise interrupting said branch (Bi); said method further comprising the step of:

d. combining all amplified information signals (A-IN1, A-IN2, . . . . , A-INi, . . . . , A-INn) from all said dedicated branches according to a multiple access technique for generating an outgoing optical signal (OUT) for transmission to said optical line terminator (OLT).

10. Apparatus for use in an optical network for transmitting information signals from a plurality of optical network users to an optical line terminator via dedicated input branches and a common output branch, comprising:

for each information signal of said information signals:
   control means, responsive to said information signal, for providing an amplification control signal and a pass control signal;
      means, responsive to said amplification control signal, for amplifying said information signal for providing an amplified information signal; and
      means, responsive to said pass control signal, for passing said amplified signal when said information signal is present and otherwise interrupting said branch; and wherein said apparatus further comprises:
      means for combining amplified information signals from said dedicated branches according to a multiple access technique for providing an outgoing optical signal for transmission to said optical line terminator.

\* \* \* \* \*

UNITED STATES PATENT AND TRADEMARK OFFICE
CERTIFICATE OF CORRECTION

PATENT NO. : 5,754,319
DATED : May 19, 1998
INVENTOR(S) : Van De Voorde et al.

It is certified that error appears in the above-identified patent and that said Letters Patent is hereby corrected as shown below:

Item [57] ABSTRACT, line 11 after "branches" insert --:--

Column 8, line 13 (claim 9, line 2) after "IN1" insert --,--

Column 8, line 14 (claim 9, line 3) cancel "In" and substitute --INn--

Signed and Sealed this

Eleventh Day of August 1998

Attest:

BRUCE LEHMAN

Attesting Officer  Commissioner of Patents and Trademarks